United States Patent [19]
Matsui

[11] 3,950,767
[45] Apr. 13, 1976

[54] CAMERA INDICATING DEVICE WITH DIAPHRAGM CONTROL

[75] Inventor: Toru Matsui, Sakai, Japan

[73] Assignee: Minolta Camera Kabushiki Kaisha, Japan

[22] Filed: Sept. 10, 1974

[21] Appl. No.: 504,763

[30] Foreign Application Priority Data
Sept. 13, 1973 Japan............................ 48-106641

[52] U.S. Cl. .................... 354/41; 354/43; 354/53; 354/60 L; 354/273
[51] Int. Cl.[2].. G03B 7/08; G03B 9/07; G03B 17/20
[58] Field of Search .................... 354/40–43, 354/36–38, 46, 47, 60 E, 60 L, 270–274, 53

[56] References Cited
UNITED STATES PATENTS

| | | |
|---|---|---|
| 3,212,418 | 10/1965 | Kuppenbender et al. ........ 354/53 X |
| 3,704,656 | 12/1972 | Ogiso et al. ...................... 354/43 X |
| 3,738,237 | 6/1973 | Uchiyama et al. ................ 354/43 X |
| 3,747,487 | 7/1973 | Tanikoshi et al. ................. 354/50 |
| 3,777,637 | 12/1973 | Kuramoto et al. ................ 354/41 X |

*Primary Examiner*—L. T. Hix
*Assistant Examiner*—James LaBarre
*Attorney, Agent, or Firm*—Watson, Cole, Grindle & Watson

[57] ABSTRACT

An indicating device for producing a warning indication of possible over or under exposures in an automatic exposure adjusting device in a photographic camera. The brightness of light rays from a photographic object which are transmitted through a diaphragm aperture, is measured for a duration in which a diaphragm is stopped down from its fully open position to a diaphragm aperture preset by a diaphragm presetting ring. When light measuring output reaches a proper level with respect to a film speed of a film used and a pre-selected shutter speed, a diaphragm control circuit is actuated so as to set the aperture size of the diaphragm. The indicating device provides an indication as to whether or not a proper diaphragm aperture may be obtained during the diaphragm-stopping-down operation so as to effect a proper exposure. A signal commensurate with the difference between a fully open diaphragm aperture and a preset diaphragm aperture is transmitted to a detecting circuit, to which is also supplied the light measuring output at a fully open diaphragm aperture, a film speed and a shutter speed, prior to commencement of the diaphragm-stopping-down operation. The output from the detecting circuit in turn actuates a warning circuit for providing the indication as to whether or not a proper diaphragm aperture is obtained.

20 Claims, 6 Drawing Figures

CAMERA INDICATING DEVICE WITH DIAPHRAGM CONTROL

BACKGROUND OF THE INVENTION

This invention relates to an exposure control device which controls a diaphragm aperture commensurate with brightness of a photographic object and a preselected shutter speed.

More particularly the invention relates to an automatic exposure control device, during a period in which a diaphragm is stopped down from its fully open position to a diaphragm aperture preset by a diaphragm presetting ring, when an output in a light measuring circuit for measuring light rays from a photographic object transmitted through the diaphragm aperture reaches a given level with respect to a film speed of a film used and a pre-selected shutter speed, then an output from a diaphragm control circuit, to which the light measuring output is supplied, causes an abrupt change in the magnetic field of an electromagnet, thereby interrupting the diaphragm-stop-down operation, whereby a proper diaphragm aperture is obtained.

In the diaphragm control type automatic exposure control device, there arises the situation where a certain value of diaphragm aperture obtained during the diaphragm-stop-down operation fails to provide a proper exposure. More specifically, there often arises the situation where an under-exposure occurs even if a diaphragm aperture commensurate with a selected shutter speed in connection with the brightness of a photographic object and the film speed is at a fully open position or an over-exposure occurs even if the diaphragm is stopped down to a diaphragm aperture preset by a diaphragm presetting ring. In the case of the over-exposure, if a diaphragm aperture to be preset by the diaphragm presetting ring is determined not to be a minimum diaphragm aperture, it is possible to provide a region in which a proper exposure is obtained. It may happen however that even if the diaphragm aperture is preset to the minimum value by the diaphragm presetting ring, an over-exposure still occurs. Furthermore, the various exchangeable objective lenses vary in diameter of the fully open diaphragm aperture and in diameter of the minimum diaphragm aperture. For this reason, it is possible that a proper exposure is obtained with respect to a certain objective lens, whereas such exposure is improper with respect to a different objective lens. This necessarily results in a need to change the pre-selected shutter speed after the diaphragm-stop-down operation has been effected in order to provide appropriate compensation.

OBJECTS OF THE INVENTION

An object of the present invention is to provide a warning indicating device for a camera automatic exposure control device.

It is accordingly a further object of the present invention to provide an indicating device for use in an automatic exposure control device which indicating device indicates whether or not a proper diaphragm aperture is obtained during the duration of the diaphragm-stop-down operation, prior to commencement of stopping down the diaphragm to a diaphragm aperture preset by a diaphragm presetting ring.

Another object of the present invention is to provide an indicating device for use in this type of automatic exposure control device, which is compatible with indicating the under-exposure when a diaphragm is in the fully open position as well as with indicating the over-exposure when a diaphragm is stopped down to a diaphragm aperture preset by a diaphragm presetting ring.

These and other objects and features of the present invention will be apparent from the ensuing part of the specification in conjunction with the drawings which indicate preferred embodiments of the invention.

SUMMARY OF THE INVENTION

In such an automatic exposure control device for use in a photograhic camera as previously described, there is provided an indicating device. In accordance with this device, a signal representative of a diaphragm which is possible to be stopped down from a fully open position to a diaphragm aperture preset by a diaphragm presetting ring as well as a signal representative of a diaphragm in the fully open position are transmitted to a detecting circuit. Additionally, signals representative of the light measuring output at the fully open diaphragm aperture, the film speed and the pre-selected shutter speed are also fed to the detecting circuit. The light measuring output is also supplied to the diaphragm control circuit prior to the commencement of the diaphragm-stop-down operation. A warning circuit is thus actuated due to the output from the detecting circuit for indicating whether or not the diaphragm control circuit may provide the appropriate predetermined level for the duration of the diaphragm-stop-down operation.

According to one embodiment of the present invention, a diaphragm control circuit includes a differential amplifying circuit having two input terminals, in which an output signal from a light measuring circuit is supplied to a first input terminal of one of the two input terminals, while a signal commensurate with a film speed and a selected shutter speed is supplied to a second input terminal. Control of the diaphragm is effected for a duration in which the diaphragm is stopped down from a fully open position to a diaphragm aperture preset by a corresponding diaphragm presetting ring. A photo-electric element in a light measuring circuit receives light rays from a photographic object transmitted through the diaphragm aperture. Consequently, a light measuring output which is to be supplied to the first input terminal is obtained by computing an information factor indicative of the brightness of a photographic object and an information factor indicative of a diaphragm aperture associated with the circuit. In the stage prior to commencement of the diaphragm-stop-down operation however, an output from the light measuring circuit, which is fed to the first input terminal, will be indicative of the brightness of a photographic object at a fully open diaphragm aperture.

The detecting circuit can also include a differential amplifying circuit having two input terminals. The light measuring output is then fed to a first input terminal of one of the two input terminals and a signal is fed to the second input terminal, this signal being commensurate with the diaphragm aperture, which is possible to be stopped down from the fully open position to an aperture value preset by a diaphragm presetting ring, in connection with a film speed setting and a pre-selected shutter speed. The detecting circuit is actuated prior to commencement of the above-described stop-down operation. Consequently, a light measuring output which is fed to the first input terminal is the light measuring output in a fully open diaphragm aperture.

Prior to commencement of the diaphragm-stop-down operation, an output from the diaphragm control circuit causes a warning circuit to indicate the existence of a possible under-exposure, if a proper exposure is not obtained even in a fully open diaphragm aperture. The warning circuit can also indicate the existence of a possible over-exposure due to an output from the detecting circuit prior to commencement of the stop-down operation, if a proper exposure is not obtained even at a stop-down diaphragm aperture preset by the diaphragm presetting ring.

The primary feature of the present invention resides in that whether or not a proper exposure can be obtained is indicated by the warning circuit prior to commencement of the diaphragm stop-down operation. An intelligence factor from the diaphragm, which is capable of being stopped down from its fully open position to an aperture preset by the diaphragm presetting ring is transmitted to or interrupted from the diaphragm control circuit, in connection with a film speed and a pre-selected shutter speed which are supplied to the second input terminal of the circuit. If this information is transmitted to the control circuit, the information is photographically computed, so that the diaphragm control circuit may serve as a detecting circuit.

DESCRIPTION OF THE PREFERRED EMBODIMENTS

Figure 1:
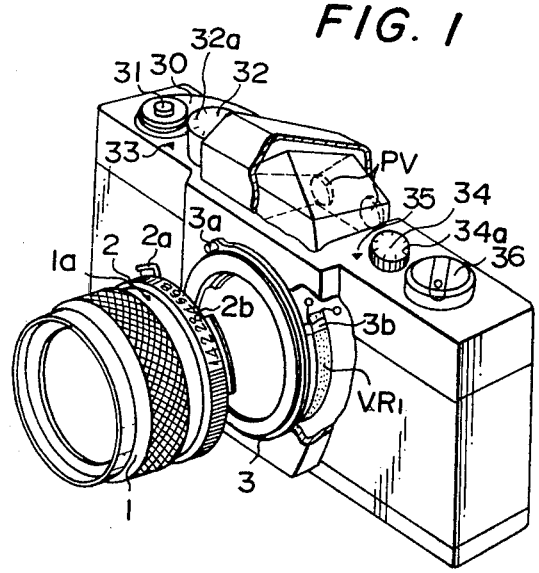
FIG. 1 is a perspective view of a photographic camera equipped with an indicating device according to the present invention, with a portion being partially cut away.

As shown in FIG. 1, a diaphragm presetting ring 2 is rotatably mounted on an exchangeable objective lens 1. The diaphragm presetting ring 2 serves to preset a diaphragm from its fully open position to a desired aperture when exposure is effected. Diaphragm presetting ring 2 has an interconnecting pawl 2a which is adapted to be engageable with a transmission ring 3 provided on the camera body, when the photographic objective lens 1 is mounted on the camera body. Graduations are provided on diaphragm presetting ring 2 for indicating the specific diaphragm aperture preset by diaphragm presetting ring 2.

Figure 3:
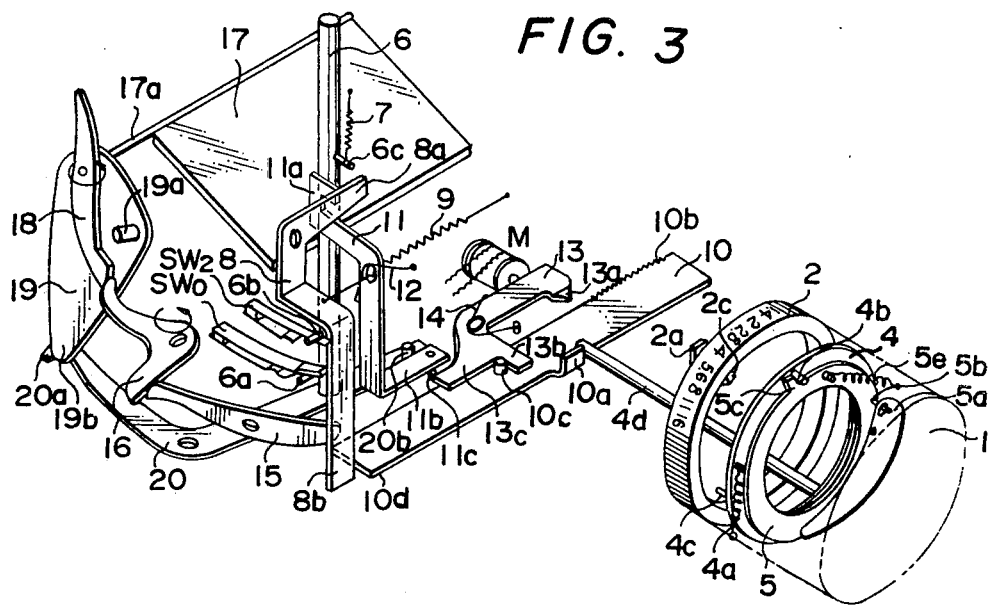
FIG. 3 is a perspective view showing the construction of an essential portion of the diaphragm control device of the embodiment of FIG. 1.

Transmission ring 3 has a projection pin 3a which is engageable with interconnecting pawl 2a and is rotatably mounted on the camera body, the transmission ring is biased so as to have a tendency to rotate in the counter-clockwise direction due to the action of a bias spring (now shown). When exchangeable lens 1 is mounted on the camera body, interconnecting pawl 2a and pin 3a are brought into engagement with each other thereby causing transmission ring 3 to be rotated in the clockwise direction in accordance with a diaphragm aperture which is preset by diaphragm presetting ring 2. Transmission ring 3 has an electric contacting piece 3b arranged around a portion of its circumference. Electric contacting piece 3b slidably contacts arcuate variable resistor VR1 which is fixedly provided on the camera body in an insulating manner with respect to the camera body.

Where a plurality of exchangeable lenses, each of whose fully opened diaphragm aperture is different in diameter, are exchangeably mounted on the camera body, an information factor indicative of the fully open diaphragm value of each respective exchangeable lens is included in an information factor from the light rays from the photographic object entering the exchangeable lens. Thus, interconnecting pawl 2a takes a constant position with respect to the specific value of the fully opened diaphragm aperture of the exchangeable lens, so far as the diaphragm presetting ring 2 is set to a fully open diaphragm value, and hence the position of electrically contacting piece 3b with respect to variable resistor VR1 is constant. Contacting piece 3b is adapted to slide on variable resistor VR1 in accordance with the changing stage of the diaphragm aperture preset by diaphragm presetting ring 2 with respect to respective fully open diaphragm of the diaphragm aperture. In the situation where a single objective lens is used, contacting piece 3b slides on variable resistor VR1 in cooperation with diaphragm presetting ring 2 which serves to provide information indicative of the diaphragm aperture preset by diaphragm presetting ring 2. Photo-electric elements PV, such as silicon blue cells are disposed within an optical path of a view finder of the camera body. The photo-electric elements receive light rays coming through exchangeable lens 1 and a diaphragm aperture defined by diaphragm leaves 5a, when moveable mirror 17 is in the viewing position, as shown in FIG. 3.

Figure 2:
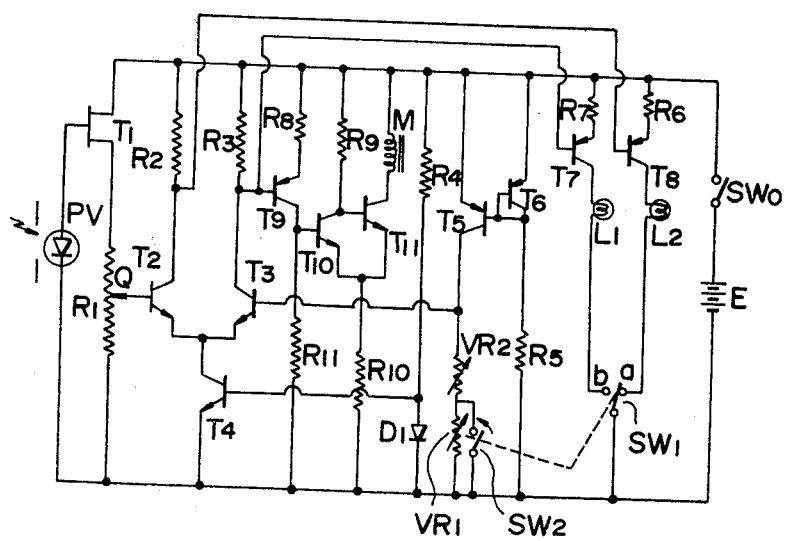
FIG. 2 is a schematic circuit diaphragm of a control circuit utilized in the embodiment of FIG. 1.

FIG. 2 schematically illustrates a diaphragm control circuit, a detecting circuit and a warning circuit in accordance with the present invention. Prior to providing a description of the circuitry illustrated in FIG. 2, the principle of the operation of the present invention will be explained below by using APEX system which is defined in ASA PH 2.12 and described in U.S. Pat. No. 3,742,828. If an apex indication of brightness B of a photographic object is assumed of Bv and an apex indication of a fully open diaphragm value of exchangeable lens 1 is assumed of Avo, then the light entering photo-electric element PV will be Bv - Avo. Meanwhile, assuming Av is representative of an apex indication of a diaphragm aperture to be preset by diaphragm presetting ring 2 of exchangeable lens 1 (the minimum diaphragm aperture of the exchangeable lens is usually preset), then the extent to stop down the diaphragm of exchangeable lens 1 is within a range from a fully open diaphragm aperture Avo to the preset diaphragm aperture Av. Supposing that a diaphragm aperture takes a value of Av′ within the above-described range and proper exposure is obtained with respect to a film speed and a selected shutter speed, then the following relationship will be obtained:

$$Bv - Avo = (Av' - Avo) + Tv - Sv$$

wherein Tv is an apex indication of the selected shutter speed, Sv is an apex indication of the film speed and Av′ − Avo is an apex indication which represents the amount of stopping down a diaphragm from a fully open diaphragm aperture value of exchangeable lens up to a properly controlled diaphragm value.

If a proper exposure is not obtained within the permissible stopping-down range from Avo to Av and an under-exposure results, then the under-exposure also will result even in the fully opened diaphragm value itself, even when Av′ − Avo = 0. Therefore, in this situation, $$Bv - Avo < Tv - Sv$$

When an over-exposure occurs, with the condition of Av′ = Av, then, $$Bv - Avo > (Av - Avo) + Tv - Sv$$

Referring to the circuit shown in FIG. 2, which is based upon the above-described principle, an output voltage proportional to the logarithm of the brightness of the photographic object is obtained across opposite terminals of photoelectric element PV. The output voltage is amplified by a field effect transistor T1 which has a high input impedance. In output terminal Q of adjusting resistor R1, there is obtained an output voltage proportional to a difference Bv − Avo between the apex indication value Bv of the brightness of the photographic object and the fully open diaphragm value Avo of the photographic lens. The adjustable resistor R1 may be adjusted and fixed in the process of manufacture.

Figure 4:
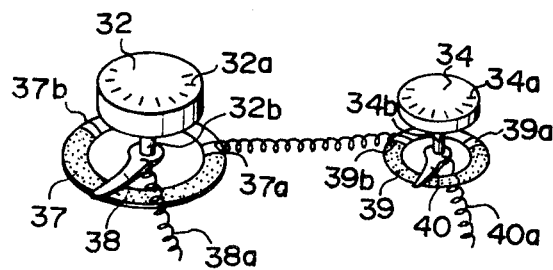
FIG. 4 is a perspective view of a device for providing photographic settings, such as film speed and shutter speed, in the embodiment of FIG. 1.

A bias circuit which is constituted by transistor T6 and resistor R5 produces a constant current which is fed to the collector of the transistor T5. That is to say, the circuit constituted by transistor T6 and resistor R5 serves as a stabilizing power source circuit for maintaining constant the bias of transistor T5 with respect to voltage fluctuation in potential source E. If the bias is suitably determined and constant current $i$ flowing to the collector of transistor T5 is set at a proper value, then a voltage drop due to variable resistor VR2 connected to the collector of transistor T5 will be proportional to a difference Tv − Sv between the apex indication Tv of the pre-selected shutter speed and the apex indication of Sv of the film speed. The difference Tv − Sv is determined by a differential adding mechanism of a mechanical resistor associating with a shutter speed dial and a film sensitivity setting dial as shown in FIG. 4.

A second variable resistor VR1 which is connected to the collector of transistor T5 via the series connection with the first variable resistor VR2, has opposite terminals connected to a short-circuitable switch SW2. When switch SW2 is opened, the resistance of the second variable resistor VR1 is inserted into the control circuit, the resistance value of the second variable resistor VR1 being set in accordance with a diaphragm aperture preset by diaphragm presetting ring 2. When a voltage proportional to the difference Tv − Sv is produced in the first variable resistor VR2, there arises across both terminals of the second variable resistor VR1 a voltage drop proportional to the apex indication value Av′ − Avo between a preset diaphragm value and the fully open diaphragm aperture.

Transistors T2 and T3 form a differential amplifier circuit. Output terminal Q of adjusting resistor R1 is connected as an input to the base of transistor T2, which constitutes a first input terminal, while the collector of transistor T5, which provides signals produced across output terminals of variable resistors VR1 and VR2, is connected as an input to the base of transistor T3, which constitutes a second input terminal.

The differential amplifier circuit is so arranged that, when the switch SW2 is in the opened position, the differential amplifier compares the output voltage proportional to the value Bv − Avo of adjusting resistor R1 with the output voltage of (Av′ − Avo) + Tv − Sv of both variable resistors VR1 and VR2 connected in series relation to each other, and if the former output voltage is larger than the latter, the output will turn on lamp L2. Stated otherwise, the collector of transistor T2 is connected as an input to the base of transistor T8, and lamp L2 is connected to the collector of transistor T8. The output produced at the collector of transistor T3 is supplied to the base of transistor T7, and lamp L1 is connected to the collector of transistor T7. Switch SW1, which is connected to lamps L1 and L2 and potential source E for switching those elements, is interconnected with switch SW2. When switch SW2 is opened, switch SW1 is actuated to cause terminal $a$ of lamp L2 to be connected with potential source E, and when switch SW2 is closed, switch SW1 causes terminal $b$ of lamp L1 to be connected with potential source E. Thus, when switch SW2 is closed, comparison is made between the output voltage (Bv − Avo) of adjusting resistor R1 and the output voltage (Tv − Sv) of first variable resistor VR2. If the former is smaller than the latter, i.e. if Bv − Avo < Tv − Sv, then the lamp L1 will be lit.

The energization of lamp L1 shows the under-exposure, while the energization of lamp L2 indicates the over-exposure. If neither of the lamps L1 and L2 is lit, it indicates that a proper exposure will be obtained. Therefore, in a case where lamp L1 is lit, a lower shutter speed should be selected while in a case where lamp L2 is lit, a higher shutter speed should be selected or otherwise the value of diaphragm aperture to be preset by the diaphragm presetting ring made smaller, thereby enabling a proper exposure to be provided. In other words, the differential amplifier circuit having transistors T2 and T3 whose bases serve as the first and second input terminals, respectively, serves as a detecting circuit, when switch SW2 is in its open position.

Transistor T4 is part of a constant current circuit which also includes resistor R4 and diode D1, and contributes to maintaining constant the sum of emitter currents of transistors T2 and T3 of the differential amplifier circuit.

The collector of transistor T3 is connected as an input to the base of transistor T9 of a switching circuit, which consists of transistors T9, T10 and T11 and resistors R8, R9, R10 and R11, and an electromagnet M is connected to the collector of transistor T11.

As the release operation continues and after switch SW2 has been rendered close, the diaphragm is stopped down in a manner which will be described later. When the output Bv − Av′ of adjusting resistor R1 reaches the level equal to the output Tv − Sv of variable resistor VR2, then current flow to transistor T11 is interrupted by way of transistor T9 connected to the collector of transistor T3 and transistor T10. This interruption of current flow to transistor T11 in turn causes the current flow to electromagnet M to be interrupted. The diaphragm-stopping-down operation then is arrested in the position, after which movable mirror 17 is turned from the viewing position to the photographic position, followed by release of the shutter. Stated otherwise, the differential amplifier circuit having transistors T2 and T3 whose bases serve as input terminals, respectively, serves as a diaphragm control circuit, when switch SW2 is rendered closed and the diaphragm-stopping-down operation commences.

The mechanical construction for achieving the above operations will be described below with reference to FIG. 3. Disposed within the exchangeable lens barrel 1 are diaphragm actuating ring 4 and diaphragm adjusting ring 5. The diaphragm actuating ring has a tendency of being rotated in the counter-clockwise direction about the optical axis of the lens barrel under the action of weak spring 4a and the diaphragm adjusting ring 5 has a tendency of being rotated in the clockwise direction about the optical axis under the action of a strong spring 5e. Pin 4b projecting from diaphragm actuating ring 4 is adapted to engage projection 5c of diaphragm adjusting ring 5 when the adjusting ring is rotated in the clockwise direction. Pin 4c projecting from diaphragm actuating ring 4 is engageable with projection 2c, which projects from diaphragm presetting ring 2 rotatably fitted over exchangeable lens barrel 1, when diaphragm actuating ring 4 is rotated by diaphragm adjusting ring 5 in a clockwise direction against the bias tendency of spring 4a. Through the engagement of both pin 4c and projection 2c, the diaphragm actuating ring 4 is locked in a position of diaphragm aperture preset by diaphragm presetting ring 2. Diaphragm actuating ring 4 has an interconnecting pin 4d which extends within the camera body when the exchangeable lens is mounted on the camera body. Diaphragm adjusting ring 5 has a pin 5b which engages diaphragm leaves 5a (in FIG. 3, only a single leaf is shown) to cause the rotation of the leaves, so that the diaphragm will be stopped down through the rotation in the clockwise direction, of the diaphragm adjusting ring.

Diaphragm presetting ring 2 is also provided with the previously described interconnecting pawl 2a as well as graduations 2b for selecting a diaphragm aperture to be preset, with any of the graduations brought into coincidence with indicia 1a provided on exchangeable lens barrel 1.

There is provided a release lever 6 which is vertically slidable relative to the camera body and which tends to be forced upwardly under the action of spring 7. Release lever 6 has three projecting pins 6a, 6b and 6c. When release lever 6 is depressed during the release operation, first pin 6a closes power source switch SWo and then pin 6b closes switch SW2. Upon closing of these switches, the outputs from the differential amplifier circuit, acting as a detecting circuit, causes either lamp L1 or L2 to energize or de-energize by way of a warning circuit, depending upon the exposure condition, thus indicating whether an over-exposure, an under-exposure or a proper exposure will be obtained. In the case where the warning circuit energizes neither lamp L1 or lamp L2, and it is indicated that a proper exposure is controlled, if release lever 6 is further depressed, then pin 6c comes to engage arm 8a of arresting lever 8, with switch SW2 being maintained closed. Arm 8a is thus urged in the clockwise direction against the force of spring 9, thereby releasing the other arm 8b of arresting lever 8 from engagement with engaging end 10d of diaphragm control plate 10, so that the diaphragm control plate is free to move leftwards. Diaphragm control plate 10 has a bent piece 10a which is adapted to engage interconnecting pin 4d, so that the plate 10 may be actuated by diaphragm adjusting ring 5. Diaphragm control plate 10 also has a pin 10c engaging locking lever 13 and a toothed portion 10b engageable with locking pawl 13a of locking lever 13. Until pin 6c rotates arresting lever 8, spring 9 initially biases, by way of diaphragm actuating plate 10 and interconnecting pin 4d, diaphragm adjusting ring 5 in the counter-clockwise direction against the tendency thereof caused by spring 5e, so that diaphragm leaves 5a will be maintained open.

Retaining lever 11 is biased in the counter-clockwise direction under the action of spring 12 and has a hook portion 11a which is engageable with arm 8a of arresting lever 8 when said retaining lever 11 is rotated in the clockwise direction by locking lever 13 as described. Retaining lever 11 also has an arm 11b engageable with pin 20b of return lever 20, to be described later, and pin 11c provided on arm 11b and engageable with locking lever 13.

The locking lever 13 has locking pawl 13a engaging toothed portion 10b of diaphragm control plate 10, arm 13b engageable with pin 10c and arm 13c engageable with pin 11c. The lever 13 is biased in the clockwise direction under the action of spring 14 and is attracted to electromagnet M against this bias, when the electromagnet is excited due to outputs from the diaphragm control circuit.

Lever 15, which has one end facing a shifting locus of release lever 6, is engageable with lever 16 which is biased in the counter-clockwise direction. Lever 16 is engageable with mirror lever 18 which is rigidly mounted on rotary shaft 17a of movable mirror 17 and biased in the counter-clockwise direction. Through engagement of lever 16 with lever 18, the movable mirror is arrested in the viewing position.

Mirror returning lever 19 is rotatably and loosely mounted on rotary shaft 17a, the mirror returning lever having a pin 19a engageable with mirror lever 18 and a projection 19b engageable with hook portion 20a of return lever 20 and biased in the clockwise direction under the strong force.

Return lever 20 is urged in the clockwise direction from the position shown in FIG. 3 due to signals of termination of exposure in the same manner as a known quick return mechanism (not shown), upon termination of exposure, whereby projection 19b of mirror returning lever 19 is released from hook portion 20a, as well as pin 20b urges retaining lever 11 in the counter-clockwise direction against the force of spring 14, thereby releasing arresting lever 8 from the position locked by hook portion 11a which arrests the counter-clockwise directional rotation of the lever 8. The rotation of return lever 20 further causes locking lever 13 to be urged in the counter-clockwise direction by way of retaining lever 11, whereby locking pawl 13 releases toothed portion 10b, and thus locking lever 13 comes into contact with electro-magnet M.

Turning now back to the construction of the first variable resistor VR2 in conjunction with FIG. 1, shown at 30 is a film winding lever, at 31 a shutter button and at 32 a shutter speed dial, which is rotatable relative to the camera body, so that any of shutter speed graduations 32a will coincide with indicia 33 provided on the camera body to select a shutter speed. Shown at 34 is a film speed dial provided with film speed graduations 34a, any of which can be made to coincide with indicia 35 provided on the camera body in correspondence with the speed of the film used. Shown at 36 is a film unwinding spool.

Shutter speed dial 32 and film speed dial 34 are illustrated in greater detail in FIG. 4. Sliding element 38 is securely mounted on shaft 32b of shutter speed dial 32 in such a manner to be integrally rotatable and in an insulating relationship to shaft 32b. Sliding element 40 is securely mounted on shaft 34b, of film speed dial 34 also in an insulating relationship to the body, and resistor 39, along which sliding element 40 is slidable, is disposed on the camera body also in an insulating relationship.

Resistor 39, whose one terminal 39a is electrically unconnected, has its other terminal 39b connected to one terminal 37a of resistor 37, while the other terminal 37b of resistor 37 is open and the terminal 38a is connected to the collector of transistor T5 of FIG. 2. Lead wire 40a connected to sliding element 40 is connected to variable resistor VR1 and one terminal of switch SW2 as shown in FIG. 2, while lead wire 38a connected to sliding element 38 is connected to the base of transistor T3. Thus, there is produced across the combination of sliding elements 38 and 40 a voltage signal proportional to Tv − Sv.

Figure 5:
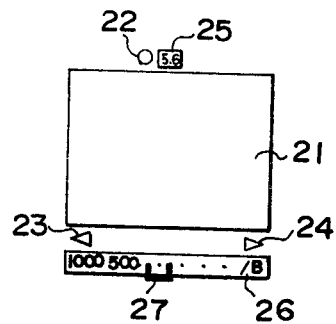
FIG. 5 is a front view of an indicating device located within a view finder in the above embodiment.

FIG. 5 shows a field of view as viewed from an occular portion of a view finder in the camera. A lamp of indicating portion 22 which is located above the circumference of photographic image 21, is connected in series to lamp L2, so as to indicate the over-exposure for giving a warning, in order that the diaphragm may be further stopped down from a preset aperture to a smaller aperture. Graduations 26 and movable indicia 27 indicate the selected shutter speed. Indicating portion 23 in association with lamp L2 indicates an over-exposure, while indicating portion 24 in association with lamp L1 indicates an under-exposure, so as to give an instruction that the selected shutter speed should be altered. Indicating portion 25 shows the diaphragm aperture preset by the diaphragm presetting ring 2.

In operation, when the device is in the condition of termination of winding as shown in FIG. 3, if release lever 6 is depressed to effect the release operation, first potential source switch SWo is closed thereby actuating the circuit of FIG. 2, in which switch SW2 remains open, whereby electromagnet M attracts locking lever 13 thereto. In the detecting circuit, since switch SW2 remains open and switch SW1 is maintained in contact with contacting piece a, lamp L2 indicates whether a proper exposure is provided by controlling the diaphragm or an over-exposure will result even by controlling the diaphragm.

If release lever 6 is further depressed, then switch SW2 is closed thereby connecting switch SW1 to contacting piece b, whereby lamp L1 will indicate whether a proper exposure is provided by controlling the diaphragm or an underexposure will result even by the control of the diaphragm.

If release lever 6 is pressed downwards to a further extent, then pin 6c is caused to urge arresting lever 8 in the clockwise direction against the force of spring 9, while switch SW2 is maintained closed. Consequently, diaphragm control plate 10 follows the shift of arresting lever 8, so that diaphragm adjusting ring 5 will start closing diaphragm leaves 5a. Consequently, the quantity of light entering photo-electric element PV gradually decreases. This causes a variation in the input flowing to transistor T2. When the level of input flowing to transistor T2 is lowered to coincide with the input flowing to transistor T3, electric current to electromagnet M is cut off thereby de-actuating the electromagnet, whereby locking lever 13 is urged in the clockwise direction under the action of spring 14, thereby bringing locking pawl 13a into engagement with toothed portion 10b of diaphragm control plate 10. Thus, the leftward motion of diaphragm control plate 10 is arrested, so that the diaphragm leaves 5a will be arrested in the stopped-down position by way of interconnecting pin 4d.

The rotation of locking lever 13 in the clockwise direction causes its one end 13c to bear against pin 11c, whereby lever 11 is urged in the clockwise direction until its hook portion 11a engages arresting lever 8. Arresting lever 8 thus will be locked in this position to which it has been rotated, against the force of spring 9 acting on lever 8 to return it to its original position. If release lever 6 is further pressed downwards, the lower end of lever 6 comes to bear against one end of lever 15, thereby urging the lever in the clockwise direction. The rotation of lever 15 in the clockwise direction due to release lever 6 causes the rotation of levers 16 and 18, whereby movable mirror 17 is sprung upwards. Upon completion of the motion of movable mirror 17, the shift of the mirror system allows exposure light from the diaphragm aperture to pass through to the film plate, which is controlled in the manner previously described due to a shutter speed selected by the shutter release operation. Upon termination of exposure, return lever 20 is urged in the clockwise direction, whereby mirror returning lever 19 causes movable mirror 17 to return to its original position, while arresting lever 8 is released from the locked condition by retaining lever 11, and thus the device is returned to a diaphragm opened condition as shown in FIG. 3.

Figure 6:
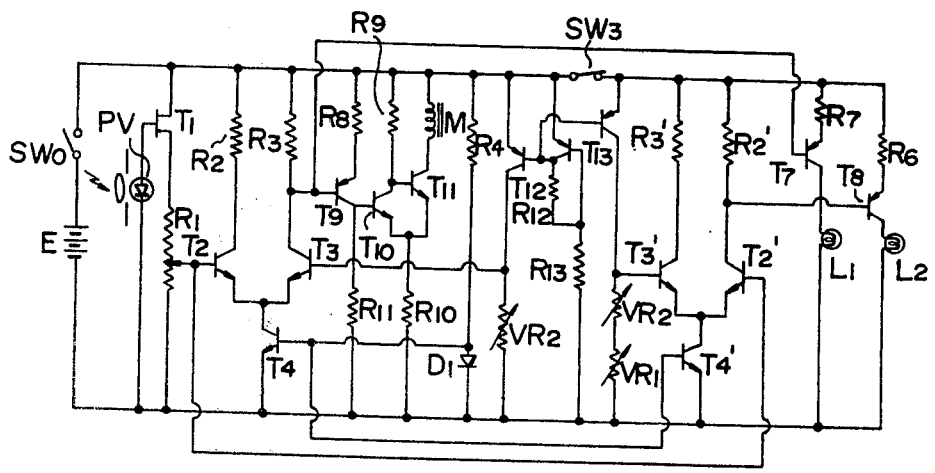
FIG. 6 is a schematic circuit diagram of another embodiment of a control circuit according to the present invention.

The circuit shown in FIG. 6 is another embodiment of the diaphragm control circuit and detecting circuit, wherein switches SW1 and SW2 are omitted and an indication for both the under-exposure and the over-exposure is simultaneously effected. Components common in construction and function to the circuit of FIG. 2 are shown by the identical reference numerals.

Transistor T13 and fixed resistors R12 and R13 constitute a circuit for stabilizing the base potential of transistor T12 with respect to fluctuations in the potential source voltage thereby effecting voltage compensation. Constant current flows to transistors T12 and T13, and the previously described information factors Tv − Sv and Av' − Avo are converted into voltages by variable resistor VR2 and variable resistor VR1, respectively. The right-hand portion from switch SW3 constitutes a detecting circuit and a warning circuit. Switch SW3 tends to be normally closed and is adapted to be opened when release lever 6 is further depressed after the closure of potential source switch SWo, whereby the detecting circuit and warning circuit are interrupted from the potential source E.

The detecting circuit is a differential amplifier circuit consisting of transistors T2′, T3′ and T4′ and resistors R2′ and R3′, which differential amplifier circuit is similar in construction to the differential amplifier circuit including transistors T2, T3 and T4 and resistors R2 and R3 which serves as a diaphragm control circuit. In the latter differential amplifier circuit, the light measuring output from the light measuring circuit is supplied to the base of transistor T2, and a signal voltage commensurate with Tv − Sv from the first variable resistor VR2 is supplied to the base of transistor T3. In contrast, in the former differential amplifier circuit, the light measuring output from the light measuring circuit at a fully open diaphragm aperture is supplied to the base of transistor T2', while a signal voltage obtained by computing the signal voltage commensurate with Tv − Sv of the first variable resistor VR2 and the signal voltage in the second variable resistor VR1 which is proportional to Av − Avo is supplied to the base of transistor T3'.

The collector of transistor T2' of the detecting circuit is connected as an input to the base of transistor T8 which causes lamp L2 to be energized. The collector of transistor T3 of the diaphragm control circuit is connected as an input to the base of transistor T7 which causes lamp L1 to be energized.

In a case where an under-exposure would result at a fully open diaphragm aperture, prior to commencement of the diaphragm-stop-down operation, lamp L1 is lit to thereby indicate the under-exposure condition. When an over-exposure would result even if the diaphragm is stopped down to a diaphragm aperture preset by the diaphragm presetting ring, lamp L2 is lit to indicate the over-exposure condition. In the course of stopping down the diaphragm to a preset value, if a proper diaphragm aperture is obtained however, then neither lamp L1 or lamp L2 will be lit.

In the above-described two embodiments, transistors T7 and T8 are rendered conductive to indicate an improper exposure and in turn are cut off to indicate a proper exposure. The switching operation of both transistors may be reversed however, so that energization of both lamps may indicate a proper exposure, and de-energization of either of lamps may indicate the over-exposure or under-exposure.

Alternatively, only a single lamp may be used to be connected to transistor T7 or T8 by way of a change-over switch. Also, the warning circuit may be so arranged that when in the over-exposure condition, the lamp is illuminated, when a proper exposure is obtained, the lamp is shut off, while in the under-exposure, the lamp is continuously lit.

In addition to the two lamps, another lamp may be employed in such a manner that the under-exposure or over-exposure is indicated by energization of one of the two lamps and a proper exposure is indicated by energization of the third lamp.

It is noted that the above description and the accompanying drawings are provided merely to present exemplary embodiments of the present invention and that additional modifications of such embodiments are possible within the scope of this invention without deviating from the spirit thereof.

I claim:

1. An indicating device for a camera of the type in which a diaphragm is stopped-down to a preset aperture size for a proper exposure, in response to a shutter release operation, selected in dependence upon the intensity of light transmitted through an objective lens and a selected shutter speed and a set film speed, the indicating device comprising:
    means for presetting a diaphragm aperture value in a range from a maximum aperture value to a minimum aperture value, to which preset aperture value the diaphragm can be stopped-down to a maximum extent upon actuation of an exposure operation;
    first signal producing means for producing a signal commensurate with the difference between the maximum aperture value and the preset aperture value;
    light means for measuring the intensity of light transmitted through the objective lens and the diaphragm aperture and producing and output signal indicative of such measurement;
    second signal producing means for producing a signal commensurate with a selected shutter speed and film speed;
    third signal producing means for producing a first indicating signal when the output signal from said light measuring means is lower in level than that from said second signal producing means, said third signal producing means being activated prior to the actual stop-down operation of the diaphragm;
    fourth signal producing means for producing a second indicating signal when the output signal from said light measuring means is higher in level than the sum of the signals from said first and second signal producing means, said fourth producing means being activated prior to the actual stop-down operation of the diaphragm; and,
    indicating means for indicating that an under-exposure will occur even if the diaphragm is set to the maximum aperture value and that an over-exposure will occur even if the diaphragm is set to the preset aperture value, respectively in response to the first indicating signal and the second indicating signal.

2. An indicating device as defined in claim 1, wherein said third signal producing means produces the first indicating signal in response to the shutter release operation and prior to actual stop-down operation of the diaphragm and said fourth signal producing means produces the second indicating signal in response to the shutter release operation and prior to the actual stop-down operation of the diaphragm.

3. An indicating device as defined in claim 2, wherein said first and second signal producing means are electrically connected in series and said indicating device further comprises:
    a switch for establishing a short-circuit between opposite terminals of said first signal producing means, said switch being normally open;
    means for closing said switch during the shutter release operation and prior to the actual stop-down operation of the diaphragm.

4. An indicating device as defined in claim 1, wherein said indicating means includes a first indicating lamp energized by the first indicating signal and a second indicating lamp energized by the second indicating signal.

5. An arrangement as defined in claim 1, wherein: said indicating device is included in a camera which comprises a view finder having a field of view and means for showing the shutter speed set on said camera within the field of view; and said indicating means includes means for indicating a necessity for changing the shutter speed setting, in the field of view in a position near the indication of the shutter speed.

6. An arrangement as defined in claim 5, wherein said means for indicating the necessity of changing the shutter speed includes a first indicating member responsive to the first indicating signal to indicate that the shutter speed should be set to a slower value than that set on said camera and a second indicating member responsive to the second indicating signal to indicate that the shutter speed should be set to a faster value than that set on said camera.

7. An arrangement as defined in claim 6, wherein: said camera further comprises means for showing the diaphragm value setting of said camera within the field of view; and said indicating means further includes a third indicating member responsive to said second indicating signal to indicate a necessity for changing the diaphragm aperture setting in the field of view near the indication of the diaphragm aperture setting.

8. An arrangement as defined in claim 1, wherein: said indicating device is included in a camera which comprises a view finder having a field of view and means for showing the diaphragm aperture setting within the field of view; and said indicating means includes an indicating member for indicating in the field of view at a position near the indication of the diaphragm aperture setting when the diaphragm should be set to a different value.

9. A camera comprising:
an objective lens having a diaphragm;
means for stopping-down said diaphragm in response to a shutter release operation;
manual means for selecting a shutter speed and setting a film speed;
means for measuring the intensity of light transmitted through said objective lens and said diaphragm and producing an output signal indicative of such measurement;
manual means for presetting a diaphragm aperture value in a range from a maximum aperture value to a minimum aperture value, to which preset aperture value said diaphragm can be stopped-down to a maximum extent upon actuation of an exposure operation;
first signal producing means for producing an output signal commensurate with the selected shutter speed and the set film speed;
means for arresting the stop-down operation of said diaphragm to determine the diaphragm aperture value in comparison with the output signal from said light measuring means and the output signal from said first signal producing means; and,
indicating means for indicating a possibility of under-exposure and a possibility of over-exposure including:
second signal producing means for producing an output signal commensurate with the difference between the maximum diaphragm aperture value and the preset diaphragm aperture value;
third signal producing means for producing a first indicating signal when the output signal from said light measuring means is lower in level than the output signal from said first signal producing means, said third signal producing means being activated prior to the actual stop-down operation of said diaphragm;
fourth signal producing means for producing a second indicating signal when the output signal from said light measuring means is higher in level than the sum of the output signals from said first and second signal producing means, said fourth signal producing means being activated prior to the actual stop-down operation of said diaphragm; and
indicating means responsive to the first and second indicating signals for respectively indicating that an under-exposure will occur even if said diaphragm is set to the maximum aperture value and that an over-exposure will occur even if said diaphragm is stopped-down to the preset diaphragm aperture value.

10. A camera as defined in claim 9, wherein said third and fourth signal producing means respectively produces the first and second indicating signals in response to the shutter release operation and prior to the actual stop-down operation of said diaphragm.

11. A camera as defined in claim 9, wherein said first and second signal producing means are electrically connected in series with each other and said camera further comprises: a switch connected to opposite terminals of said second signal producing means, said switch being closable for short-circuiting said second signal producing means during the shutter release operation and prior to the actual stop-down operation of said diaphragm.

12. A camera as defined in claim 10, wherein said arresting means includes:
a first differential amplifier having one input terminal connected to an output terminal of said light measuring means and another input terminal connected to an output terminal of said first signal producing means;
an electromagnet energized in response to the shutter release operation and disenergized when the output signal from said first differential amplifier becomes zero; and,
an arresting member for releasably arresting said diaphragm during the stop-down operation when said electromagnet is de-energized.

13. A camera as defined in claim 9, wherein said indicating means includes a first indicating member activated by the first indicating signal and a second indicating member activated by the second indicating signal.

14. A camera as defined in claim 9, further comprising a view finder having a field of view and means for showing the shutter speed set on said camera within the field of view; and said indicating means includes means for indicating a necessity for changing the shutter speed setting, in the field of view in a position near the indication of the shutter speed.

15. A camera as defined in claim 14, wherein said means for indicating the necessity of changing the shutter speed includes a first indicating member responsive to the first indicating signal to indicate that the shutter speed should be set to a slower value than that set on said camera and a second indicating member responsive to the second indicating signal to indicate that the shutter speed should be set to a faster value than that set on said camera.

16. An arrangement as defined in claim 15, wherein: said camera further comprises means for showing the diaphragm value setting of said camera within the field of view; and said indicating means further includes a third indicating member responsive to said second indicating signal to indicate a necessity for changing the diaphragm aperture in the field of view near the indication of the diaphragm aperture setting.

17. A camera as defined in claim 9, further comprising a view finder having a field of view and means for showing the diaphragm aperture setting within the field of view; and said indicating means includes an indicating member for indicating in the field of view at a position near the indication of the diaphragm aperture setting when the diaphragm should be set to a different value.

18. A camera as defined in claim 12, wherein said third signal producing means includes said first differential amplifier of said arresting means and said indicating means is connected to the output terminal of said first differential amplifier so as to operate in response to the output of said first differential amplifier.

19. A camera as defined in claim 18, wherein said fourth signal producing means includes a second differential amplifier having an input terminal connected to the output terminal of said light measuring means and another input terminal connected to the output terminals of said first and second signal producing means, and said indicating means is also connected to the output terminal of said second differential amplifier so as to operate in response to the output of said second differential amplifier.

20. A camera as set forth in claim 19, further comprising a potential source and switching means for connecting said potential source to said second differential amplifier and disconnecting such a connection during the shutter release operation but prior to the actual stop-down operation of said diaphragm.

\* \* \* \* \*